April 16, 1968     W. R. McALPINE     3,377,905

CONNECTOR PLATE

Original Filed April 2, 1965     2 Sheets-Sheet 1

INVENTOR.
WILLIAM R. McALPINE
BY Hamilton & Cook
ATTORNEYS

April 16, 1968     W. R. McALPINE     3,377,905
CONNECTOR PLATE

Original Filed April 2, 1965     2 Sheets-Sheet 2

INVENTOR.
WILLIAM R. McALPINE
BY *Hamilton & Cook*
ATTORNEYS

United States Patent Office 3,377,905
Patented Apr. 16, 1968

3,377,905
CONNECTOR PLATE
William R. McAlpine, Pompano Beach., Fla., assignor to Sanford Industries, Inc., Pompano Beach, Fla., a corporation of Florida
Continuation of application Ser. No. 444,972, Apr. 2, 1965. This application Aug. 9, 1967, Ser. No. 659,535
1 Claim. (Cl. 85—13)

ABSTRACT OF THE DISCLOSURE

A metallic connector plate for joining wooden members which presents a multiplicity of teeth extending transversely outwardly from the plate. Each tooth has a base portion and a tip portion of substantially lesser width than the base portion. The opposed edges of each portion are parallel with one edge of the tip portion being a continuation of one edge of the base portion. These teeth may be oriented in rows parallel to the joinder line of the wooden member joined thereby with a predetermined number of teeth per row for selective utilization of the tensile strength of the plate itself.

---

This application is a continuation of application Ser. No. 444,972, filed Apr. 2, 1965, and now abandoned.

The present invention relates generally to connector plates for connecting wooden members together at a joint. More particularly, the present invention relates to connector plates having a plurality of teeth punched therefrom and extending outwardly from the plate to permit them to be pressed into the wood of the members to be connected. Specifically, the present invention relates to particularly shaped teeth for such connector plates as well as the particular orientation of the teeth with respect to the joint.

Toothed connector plates are particularly adapted for connecting wooden structural members at their joints. The ultimate strength of such a connector plate is determined by whichever is the lesser of the three strength factors a connector plate must possess.

One of the three factors is the tensile strength of the plate itself—that is, the strength of the plate to resist a tensile force applied across the joinder line of the wooden members connected thereby.

A second factor is the shear strength of the plate. The shear strength is measured by the aggregate shear strength of the teeth across their bases parallel to the plate.

The third factor is the holding power of the teeth. That is, the resistance offered by the teeth against extraction from the wooden structural members into which they are embedded.

It should thus be readily apparent that the ultimate strength of the connector plate is controlled by the upper limit of the weakest of the aforementioned three factors. Proper, and FHA approved, design procedures demand that the design strength value for a connector plate equal 67% of the yield strength or 33% of the ultimate strength, whichever is lower. The yield strength, often referred to as the slip point, is defined as the load required to cause a separation of the structural members at the joinder line amounting to 0.015″.

The early constructions of connector plates were limited in design strength by the holding power of the teeth. Further improvements in tooth construction increased the holding power to such an extent that the tensile strength of the plate became the controlling factor in arriving at a design value and with this the yield strength became the controlling design criteria.

To the truss fabricator, or man who uses connector plates to join together wooden structural members, two additional considerations are of prime importance. While he requires the maximum strength in the connector plate, he must obtain it from a plate which can be driven into connecting engagement wtih the wood with minimum driving pressure. Moreover, the plate must be as readily usable with soft or hard woods without fear of splitting the wooden members, and further, the teeth must not cut excessive amounts of the wood fibers—thus reducing the effective strength of the structural member below the effective strength of the connector plate.

It is therefore an object of the present invention to provide an approved connector plate in which the tooth design and orientation each contribute to an improved yield strength.

It is another object of the present invention to provide a connector plate, as above, in which the teeth provide an improved entry—i.e., the teeth may be set into the wooden members with modest embedment pressure—without cutting excessive fibers, without splitting the wooden members and without themselves bending or crushing during embedment.

It is still another object of the present invention to provide a connector plate, as above, in which the teeth have an exceptionally high aggregate shear strength.

It is a further object of the present invention to provide a connector plate, as above, in which the teeth provide an increase in the lineal penetration for a given plate area, thus directly increasing the holding power.

It is a still further object of the present invention to provide a connector plate, as above, which has exceptional tensile strength when used on tensile joints and, at the same time, exceptional shear strength when used on shear joints.

It is an even further object of the present invention to provide a connector plate, as above, in which the configuration and orientation of the teeth are such as to provide an exceptionally desirable slip-to-failure ratio and also to provide a reduction of the waste metal from which the plates are fabricated.

Additionally, it is an object of the present invention to provide a connector plate, as above, which has an increased ultimate strength as well as yield strength to permit a higher design strength value than any known prior art construction.

These and other objects which will become apparent from the following specification are accomplished by means hereinafter described and claimed.

One preferred embodiment of the plate with a preferred and alternate tooth construction, is shown by way of example in the accompanying drawings and hereinafter described in detail without attempting to show all of the various forms and modifications in which the invention might be embodied; the invention being measured by the appended claim and not by the details of the specification.

Figure 1:
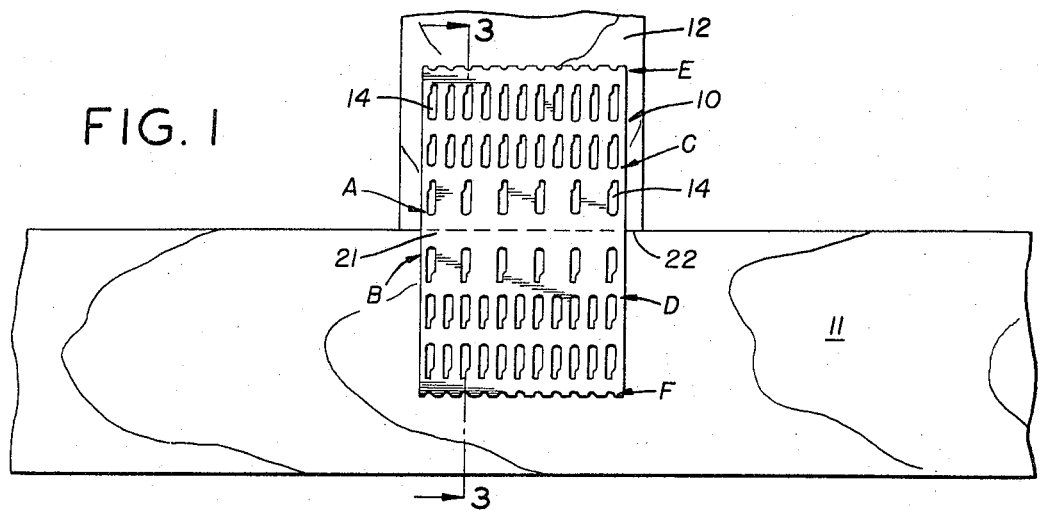
FIG. 1 is an elevation of a typical truss joint depicting a connector plate according to the concept of the present invention in top plan.
Figure 7:
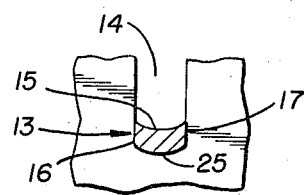
FIG. 7 is a cross section taken substantially on line 7—7 of FIG. 5.
Figure 2:
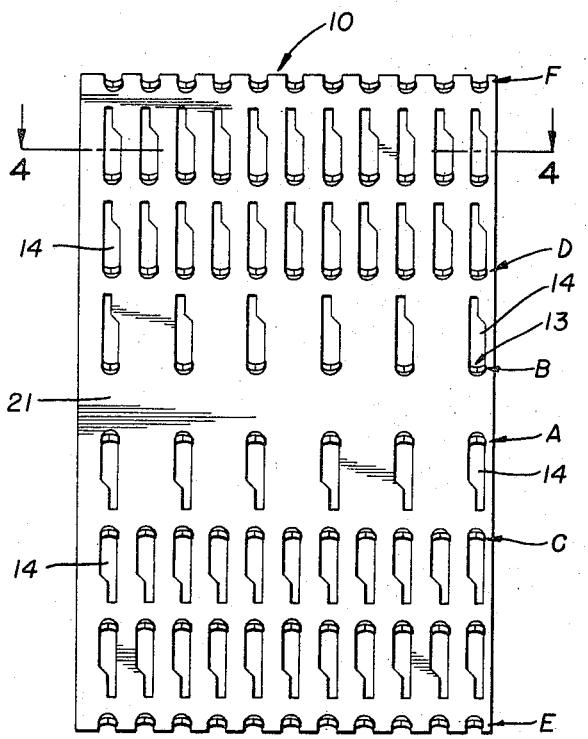
FIG. 2 is an enlarged bottom plan of the connector plate shown in FIG. 1 and taken substantially on line 2—2 of FIG. 3.

In general, a connector plate constructed according to the concept of the present invention has a plurality of teeth which extend transversely outwardly of the plate from which they are struck, or punched. Each tooth is preferably dished and has a generally rectangular base portion and a narrower rectangular tip portion. The outermost end of the tip portion as well as the shoulder by which the lesser width of the tip portion is offset from the base portion are, for the best results, sharpened. The teeth may be positioned in a particular fashion on each side of the medial portion of the plate which is adapted to overlie, or span, the joinder line of the wooden members joined thereby to obtain certain reuslts. Specifically, the teeth are particularly oriented to stand between the medial portion and the openings from which they are struck to increase the yield strength. Further, the teeth may also preferably be located in rows parallel to, and on each side of, the medial portion with the first row of teeth on each side of the medial portion having lesser teeth than the more remote row, or rows to increase the tensile strength of the plate.

Referring more particularly to the drawings, a connector plate according to the present invention, and designated generally by the numeral 10, is depicted connecting the lower chord member 11 to the kingpost 12 of what may be a tensile joint of a wooden truss. Generally, a plate 10 is applied to each side of the joint.

The teeth, indicated generally by the numeral 13, which are embedded into the mooden members 11 and 12 are best seen in FIGS. 3, 4, 5, 6 and 7 and are punched individually from the plate, leaving a hole 14 of the same configuration as the outline of the tooth.

Each tooth 13 has a thickness generally equal to the thickness of the plate because it was struck therefrom, and each tooth has a base portion 15 the side edges 16 and 17 of which are generally parallel and extend perpendicularly outwardly from the plate. A tip portion 18 having a lesser width than the base portion 15 is formed integrally outwardly thereof with one edge 16A being preferably a continuation of edge 16 of the base portion 15, and a second edge 19 parallel thereto but spaced closer to edge 16A than the corresponding edge 17 of the base portion 15 is spaced to edge 16. Edges 17 and 19 are joined by a shoulder 20. The shoulder 20 may be inclined if deemed necessary to facilitate entry into the wood, but may also be "squared-off," or parallel to the plane of the plate, as is the shoulder 20A, on the tooth 13' shown in FIG. 9.

Figure 9:
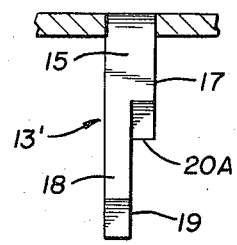
FIG. 9 is a view similar to FIG. 5 depicting an alternate tooth construction; and, FIG. 10 is a view similar to FIG. 8 depicting the interfitting of the teeth shown in FIG. 9.
Figure 4:
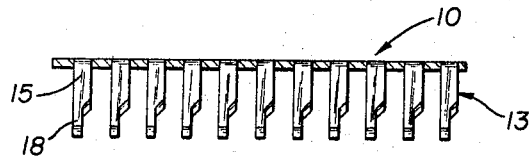
FIG. 4 is a cross section taken substantially on line 4—4 of FIG. 2 showing the teeth in elevation.
Figures 5, 6:
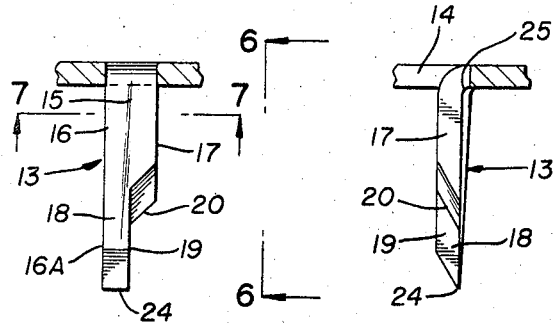
FIG. 5 is an enlarged area of FIG. 4.
FIG. 6 is a side elevation taken substantially on line 6—6 of FIG. 5.
Figure 3:
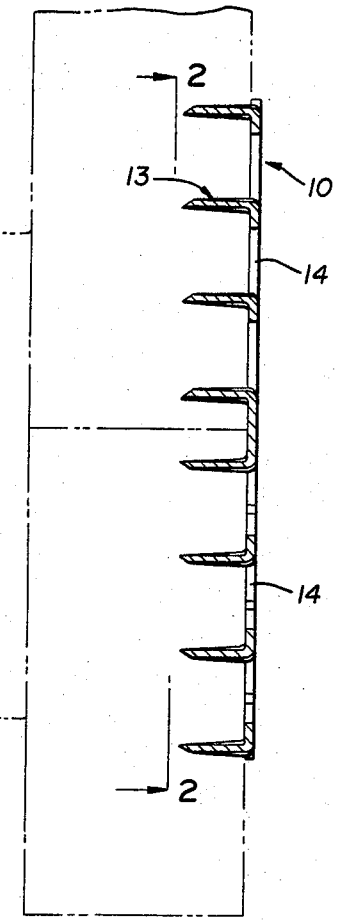
FIG. 3 is an enlarged cross section taken substantially on line 3—3 of FIG. 1.

The preferred proportions of the teeth can best be seen in FIGS. 5 and 9. The width of the base portion 15 is approximately one-quarter the length of the tooth 13, or 13', with the length of the base portion 15 being approximately ½ to ¾ the length of the tooth, and the width of the tip portion 18 being approximately ½ the width of the base portion 15. Applying these preferred proportions to obtain dimensions for a typical tooth constructed according to the concept of this invention, a tooth ½ of an inch in length would have a base portion ⅛ of an inch in width and approximately ⅜ of an inch long with the width of the tip portion being approximately ¹⁄₁₆ of an inch.

Continuing with the example of the tooth size described above, a typical connector plate, say a plate sufficient for joining two "two by fours" and which could be fabricated from 16–20 gauge metal measuring 3″ by 5″, would have a medial portion 21 adapted to span the joinder line, i.e., the abutment of the end 22 of the kingpost 12 to the lower chord member 11. A plurality of teeth 13 punched individually from such a plate on each side of the medial portion 21 leave a plurality of openings 14 in the plate from which the teeth 13 were punched, or struck.

Each tooth 13 extends perpendicularly outwardly from the plate with the broadest extent of the base portion 15 generally parallel to the medial portion 21 so that each tooth provides a large area near the surface of the wood transversely of the joinder line where most of the force across the joint is transferred between the plate and the wooden members. Because the majority of this force transmission is applied near the surface of the wooden members it can be seen that only the base portion 15 need have the maximum width. The lesser width of the tip portion thus permitted does not alter the overall penetration of the tooth and the holding power incident thereto, and, at the same time, results in easier entry of the tooth into the wood by dividing the resistance offered by the wood against entry of the teeth over two layers of the wood fibers. The entry of the tooth can thus be considered as a two-stage operation which has been found to require a lesser total force to accomplish embedment without adversely affecting the holding power of the teeth.

This lower embedment pressure is also enhanced by sharpening both the outermost end 24 of the tip portion 18 and the shoulder 20, as by beveling the edges transversely the broadest dimension of the tooth as shown in FIG. 6.

By sharpening both the end 24 of the tip portion 18 and the shoulder 20, the embedment of the tooth is cleanly accomplished with the minimum tearing and crushing of the wooden fibers. This has been found not only to lower the embedment pressure but also to reduce the tendency of the wood to split and has even proved to increase the yield point and ultimate strength of the plate.

It must be noted that each tooth is dished away from the joinder line, or medial portion 21 of the plate. Each tooth 13 is dished from the outermost end, or tip, 24 along its entire length to the root 25. This particular dishing of the tooth not only strengthens the tooth to withstand the embedment pressure without bending, but also provides a radius at the root 13 which forces the fibers at that point toward the joinder line to put them initially in compression against the tooth. Moreover, with the edges of the dished tooth oriented away from this compressed portion of the wood the application of a lateral load on the tooth which would tend to move it toward the joinder line, does not cause the edges of the tooth to cut the fibers which, it has been found, markedly decreases the yield point strength of teeth oriented reversely.

Also with regard to the positioning of the teeth, it should be observed that the teeth 13 are all particularly positioned to stand between the opening 14 from which they were struck and the joinder line, or medial portion 21 of the plate. This location facilitates imparting the required dishing of the teeth described above, but more important it also increases the tensile strength of the plate. As can be seen from FIG. 1 the entire cross section of the plate is available for tensile strength across the joinder line and between the first row of teeth on either side thereof, i.e., rows A and B, respectively. The teeth in these first rows A and B actually transfer a portion of the load between the plate and the wood before the effective cross section of the plate is reduced by the openings 14. To further increase the tensile strength of the connector plate a lesser number of teeth are utilized in the first row of teeth, A and B, one each side of the medial portion 21 than in the second row C and D, respectively. In the example depicted, rows A and B contain approximately half the number of teeth contained in the rows next remote from the medial portion 21.

The lesser number of teeth in the first rows A and B also further reduce the tendency of the ends of the wooden members to split or be crushed as loads are applied. Furthermore, accidental misalignment of the plate with the joint is far less critical than with known prior art connector plates wherein a severe loss of tensile strength of the joint can be occasioned merely by a slight accidental lateral misplacement of the plate with respect to the joinder line.

Figure 8:
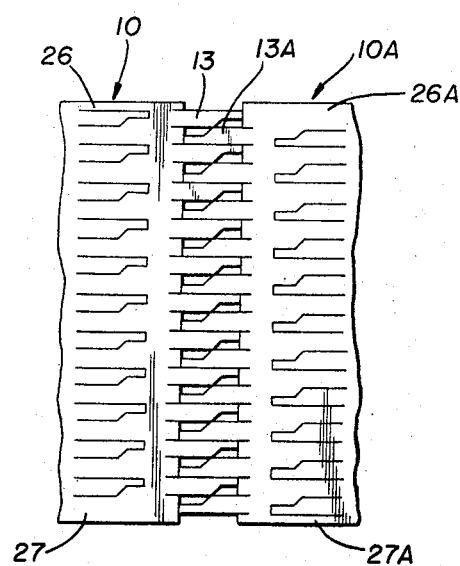
FIG. 8 is a partial top plan showing how the end rows of teeth on successively struck plates can be formed from the common waste therebetween.
Figure 10:
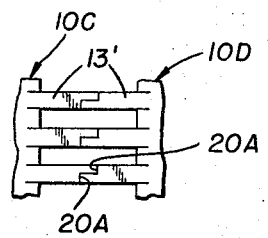

In addition to the increased yield strength occasioned by positioning the teeth 13 between the medial portion 21 of the plate and the openings 14 from which the teeth are struck, this placement has been found to permit a metal savings of as much as 7 percent in the fabrication of connector plates suitable for joining structural members made from two by four dimensional lumber. This savings is accomplished by punching the most remote row of teeth—rows E and F as shown, which preferably have the same number of teeth as rows C and D—on each end of the plate at least partially out of the same metal stock from which the end row of teeth on the next plate were punched. One way in which this interpositioning of the teeth to be formed can be laid out is shown by way of example in FIG. 8 wherein the teeth 13 on plate 10 are shown interpositioned with teeth 13A of plate 10A. This layout requires a spacing between teeth to be equal to the width of the base portion of each tooth, and the span of the side rails 26 and 27 to be of unequal width and reversed. Note 26A and 27, on successive plates. Other similar interrelationships can be obtained by placement of the teeth shoulder-to-shoulder should the spacing between teeth be desired to be less than the width of the base portion of the tooth or should it be desired to make the side rails of equal width. This arrangement is shown in FIG. 10 where teeth 13' are interlocked shoulder 20A to shoulder 20A between successive plates 10C and 10D.

It should thus be apparent that a connector plate constructed with the teeth shaped and oriented according to the concept of the present invention provide improved yield and ultimate strengths, require lower embedment pressures, and otherwise accomplish the objects of the invention.

I claim:

1. A connector plate for joining wooden members, said plate having a plurality of teeth, said teeth extending transversely outwardly from said plate, each said tooth having a thickness substantially the same as the thickness of the plate, each said tooth having a base portion and a tip portion, said base portion having edges extending perpendicularly from said plate in parallel relation, said tip portion also having parallel edges oriented perpendicularly of said plate, one of the edges of said tip portion being a continuation of one edge of said base portion, the other edge of said tip portion being offset from the corresponding edge of said base portion and connected thereto by a shoulder so that said nip portion is approximately one-half the width of said base portion, said shoulder being located approximately one-half to three-quarters of the length of the tooth outwardly from the plate, said tooth being dished along substantially its entire length, the free end of said tip portion and said shoulder being sharp so as to readily penetrate the wooden members with a minimum tearing of the wood fibers.

References Cited

UNITED STATES PATENTS

| 1,921,194 | 8/1933 | Kelly | 85—30 |
| 3,068,738 | 12/1962 | Nulick | 85—13 |
| 3,225,643 | 12/1965 | Couch | 85—13 |
| 3,266,362 | 8/1966 | Carr | 85—13 |

CARL W. TOMLIN, *Primary Examiner.*

RAMON S. BRITTS, *Assistant Examiner.*